US012569054B2

(12) United States Patent
Liao et al.

(10) Patent No.: US 12,569,054 B2
(45) Date of Patent: Mar. 10, 2026

(54) ELECTRIC CLEANING BRUSH USING BRISTLE BRUSH FOR CLEANING

(71) Applicant: Shenzhen Wanxiang Lianchen Electronic Technology Co., Ltd, Shenzhen (CN)

(72) Inventors: Kangfa Liao, Shenzhen (CN); Hui Ou, Shenzhen (CN); Jianjun Fan, Shenzhen (CN); Jie Li, Shenzhen (CN)

(73) Assignee: Shenzhen Wanxiang Lianchen Electronic Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/315,727

(22) Filed: Sep. 1, 2025

(65) Prior Publication Data

US 2025/0380793 A1    Dec. 18, 2025

(30) Foreign Application Priority Data

Jul. 1, 2025    (CN) ........................ 202510904461.X
Jul. 1, 2025    (CN) ........................ 202521371978.9
Jul. 1, 2025    (CN) ........................ 202521371981.0

(51) Int. Cl.
*A46B 3/08*        (2006.01)
*A46B 13/00*      (2006.01)
(Continued)

(52) U.S. Cl.
CPC .............. *A46B 3/08* (2013.01); *A46B 13/005* (2013.01); *A46B 13/02* (2013.01); *A46B 17/08* (2013.01);
(Continued)

(58) Field of Classification Search
CPC ......... A46B 3/08; A46B 13/005; A46B 13/02; A46B 2200/3073
See application file for complete search history.

(56) References Cited

U.S. PATENT DOCUMENTS 3,139,641 A * 7/1964 Grogan ................ A46B 13/005
451/490
3,765,726 A * 10/1973 Clark ....................... A46D 3/05
300/21
(Continued)

FOREIGN PATENT DOCUMENTS

CA        2141529 A1 * 4/1996   ........... A46B 13/005
CA        2207473 A1 * 5/1998   ............... A46B 5/06
(Continued)

*Primary Examiner* — Marc Carlson
(74) *Attorney, Agent, or Firm* — Hemisphere Law, PLLC

(57)            ABSTRACT

An electric cleaning brush using a bristle brush for cleaning is provided, which relates to the technical field of electric cleaning brushes. The electric cleaning brush includes a brush head, a spinning driving assembly, and a brush main body. The brush head is rotatably arranged on the brush main body. The spinning driving assembly is configured to drive the brush head to spin. The brush head includes a shaft-like connector. A bristle connecting portion is arranged on an outer side of the connector. The bristle connecting portion is connected with a plurality of bristles. The bristle connecting portion is configured to clamp and connect bristles in a clamping manner, so that the bristles can be better maintained on the brush head and are not likely to be disconnected. In addition, the bristles have bent cleaning portions that can correspondingly enlarge a cleaning range during spinning.

17 Claims, 11 Drawing Sheets

(51) Int. Cl.

| | |
|---|---|
| *A46B 13/02* | (2006.01) |
| *A46B 17/08* | (2006.01) |
| *A46D 1/00* | (2006.01) |
| *A47J 37/07* | (2006.01) |

(52) U.S. Cl.
CPC ........ *A46D 1/0253* (2013.01); *A47J 37/0786* (2013.01); *A46B 2200/3073* (2013.01)

(56) References Cited

U.S. PATENT DOCUMENTS

| | | | | |
|---|---|---|---|---|
| 4,110,861 | A * | 9/1978 | Pecora | B60S 3/042 |
| | | | | 15/53.4 |
| 5,160,187 | A * | 11/1992 | Drumm | A46B 3/18 |
| | | | | 15/183 |
| 5,251,355 | A * | 10/1993 | Drumm | A46B 3/18 |
| | | | | 15/183 |
| 5,358,311 | A * | 10/1994 | Drumm | A46B 13/005 |
| | | | | 300/21 |
| 5,358,312 | A * | 10/1994 | Drumm | A46B 3/18 |
| | | | | 15/183 |
| 5,445,438 | A * | 8/1995 | Drumm | A46B 13/005 |
| | | | | 15/183 |
| 5,588,172 | A * | 12/1996 | Biocca | A46B 13/005 |
| | | | | 15/207.2 |
| 8,790,228 | B2 * | 7/2014 | Wirth | A01D 46/12 |
| | | | | 264/239 |
| 2008/0172825 | A1* | 7/2008 | Weiss | A46B 13/02 |
| | | | | 15/246.2 |
| 2009/0223008 | A1* | 9/2009 | Kissel, Jr. | A01K 13/001 |
| | | | | 15/179 |
| 2011/0180013 | A1* | 7/2011 | Kissel, Jr. | A46B 13/02 |
| | | | | 119/609 |
| 2013/0180547 | A1* | 7/2013 | Kent | A46B 5/005 |
| | | | | 134/6 |
| 2016/0165842 | A1* | 6/2016 | De Koning-Trum | A46B 5/06 |
| | | | | 119/608 |
| 2018/0271266 | A1* | 9/2018 | Lin | A46B 3/18 |
| 2020/0129031 | A1* | 4/2020 | Kress | A47L 11/24 |
| 2020/0329856 | A1* | 10/2020 | Huang | A01K 13/001 |
| 2023/0059781 | A1* | 2/2023 | Lee | B08B 3/024 |
| 2025/0040690 | A1* | 2/2025 | Li | A46B 5/0095 |
| 2025/0213086 | A1* | 7/2025 | Xu | A47L 11/4041 |

FOREIGN PATENT DOCUMENTS

| | | | | |
|---|---|---|---|---|
| CA | 3211661 | A1 * | 2/2024 | B08B 9/087 |
| CN | 110385296 | A * | 10/2019 | B08B 13/00 |
| CN | 211559925 | U * | 9/2020 | A46B 9/005 |
| DE | 102009007461 | A1 * | 8/2010 | A46B 3/06 |
| DE | 202022100665 | U1 * | 2/2022 | E01H 1/05 |
| GB | 1072838 | A * | 6/1967 | A46B 3/10 |
| KR | 20000021100 | A * | 4/2000 | B08B 5/04 |
| KR | 200405844 | Y1 * | 1/2006 | A46B 3/06 |
| KR | 20080003554 | U * | 8/2008 | A46B 9/028 |
| KR | 200444063 | Y1 * | 4/2009 | A46B 3/08 |
| KR | 20100050628 | A * | 5/2010 | A46B 3/08 |
| KR | 20110003801 | U * | 4/2011 | B08B 1/34 |
| KR | 20110067376 | A * | 6/2011 | B08B 1/34 |
| KR | 20120064005 | A * | 6/2012 | A46B 9/028 |
| KR | 101856871 | B1 * | 5/2018 | A46D 3/047 |
| NL | 1040743 | A * | 12/2015 | A46B 13/005 |
| TW | 1640272 | B * | 11/2018 | A46D 1/0207 |
| WO | WO-03037135 | A1 * | 5/2003 | A46B 3/04 |
| WO | WO-2006029008 | A2 * | 3/2006 | A46B 3/08 |
| WO | WO-2011035930 | A1 * | 3/2011 | A46B 9/06 |
| WO | WO-2020174128 | A1 * | 9/2020 | A46B 7/044 |
| WO | WO-2022014079 | A1 * | 1/2022 | A47L 9/04 |

* cited by examiner

122

123

1236

53a

ELECTRIC CLEANING BRUSH USING BRISTLE BRUSH FOR CLEANING

TECHNICAL FIELD

The present disclosure relates to the technical field of electric cleaning brushes, and in particular to, an electric cleaning brush using a bristle brush for cleaning.

BACKGROUND

In the existing literature, Chinese utility model No. CN2927822Y provides a grill brush, which includes a handle and a brush head fixed with hard metal wires, and further includes a housing, a driving mechanism located inside the housing, a power part, and a control switch. The brush head is in driving connection with the driving mechanism through a rotating shaft, and the driving mechanism, the power part, and the control switch form a driving circuit loop. The driving mechanism includes a motor and a gear set. The gear set is enclosed and mounted inside a plastic box. One end of the gear set is connected to an output shaft of the motor, and a rotating shaft is arranged at the other end. The brush head spins rapidly under the action of the driving mechanism, facing a grill (a mesh product) to be brushed, and metal wires on the brush head continuously brush away residues on the grill. Using electric power instead of manual labor to brush the mesh product makes brushing more effortless and efficient. However, this has the following problems:

1. The metal wires are inserted into a central axis of the brush head by hair planting. After the grill brush is used for a period of time, the metal wires are prone to loosening and disconnection. This needs improvement.
2. Surfaces of the metal wires are smooth. When the metal wires are threaded into meshes of the grill and are in contact with side surfaces of mesh wires on two sides of the meshes, the friction is small, which is not conducive to cleaning the mesh wires on the two sides of the meshes.

SUMMARY

In order to overcome the above shortcomings, the present disclosure aims to provide an electric cleaning brush that can better maintain bristles on a brush head during cleaning of a mesh product; an electric cleaning brush that easily cleans a mesh product; and an electric cleaning brush that can better maintain bristles on a brush head during cleaning of the mesh product and easily clean a mesh product.

In order to achieve the above objectives, the present disclosure provides the following technical solutions: An electric cleaning brush using a bristle brush for cleaning includes a brush head, a spinning driving assembly, and a brush main body. The brush head is rotatably arranged on the brush main body; the spinning driving assembly is configured to drive the brush head to spin; the brush head includes a shaft-like connector; a bristle connecting portion is arranged on an outer side of the connector; the bristle connecting portion is connected with a plurality of bristles; and the bristle connecting portion is configured to clamp and connect bristles in a clamping manner.

The present disclosure further provides the following technical solution: An electric cleaning brush using a bristle brush for cleaning includes the above electric cleaning brush. The bristles have bent cleaning portions.

The present disclosure further provides the following technical solutions: An electric cleaning brush using a bristle brush for cleaning includes a brush head, a spinning driving assembly, and a brush main body. The brush head is rotatably arranged on the brush main body; the spinning driving assembly is configured to drive the brush head to spin; the brush head includes a shaft-like connector; a bristle connecting portion is arranged on an outer side of the connector; the bristle connecting portion is connected with a plurality of bristles; and the bristles have bent cleaning portions.

The additional aspects and advantages of the present disclosure will be set forth in part in the description below, parts of which will become apparent from the description below, or will be understood by the practice of the present disclosure.

BRIEF DESCRIPTION OF THE DRAWINGS

To describe the technical solutions in the embodiments of the present disclosure or in the related art more clearly, the following briefly introduces the accompanying drawings for describing the embodiments or the related art. Apparently, the accompanying drawings in the following description show merely some embodiments of the present disclosure, and a person of ordinary skill in the art may still derive other drawings from the accompanying drawings without creative efforts.

DETAILED DESCRIPTION OF THE EMBODIMENTS

Figure 1:
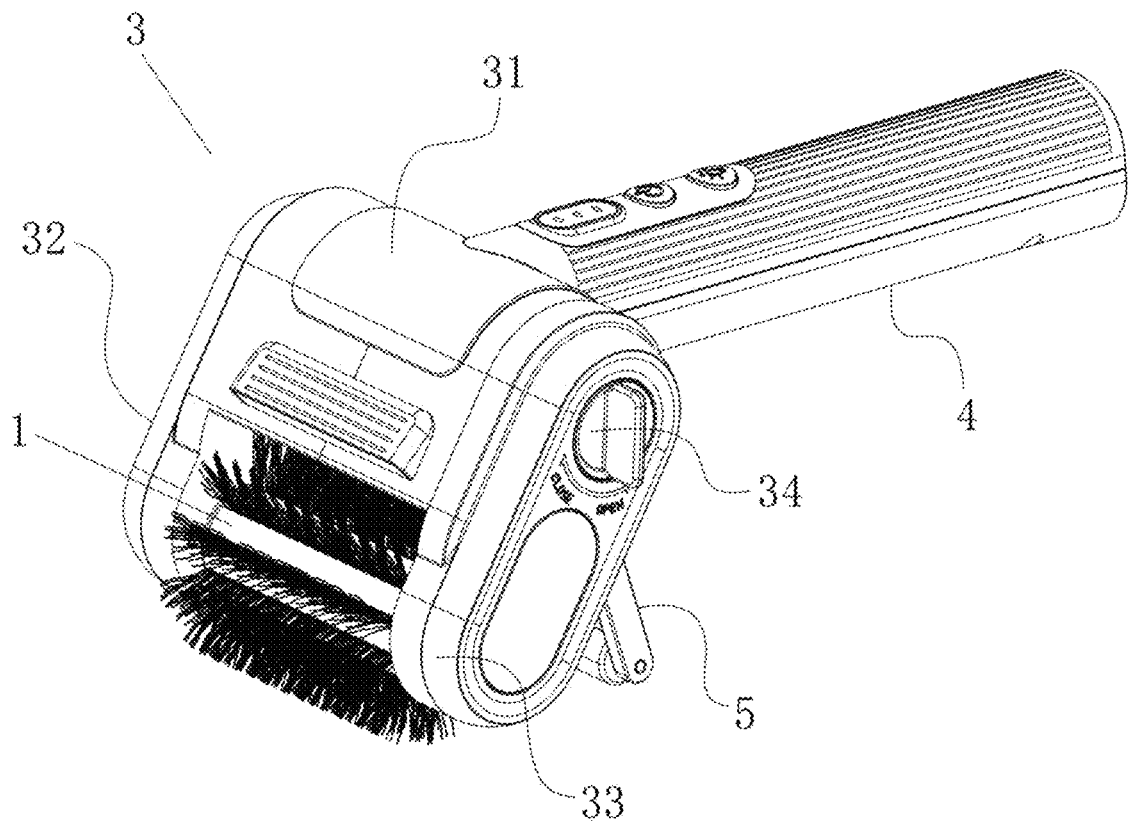
FIG. 1 is a three-dimensional structural diagram of the present disclosure, in which a brush head has bristles.
Figure 2:
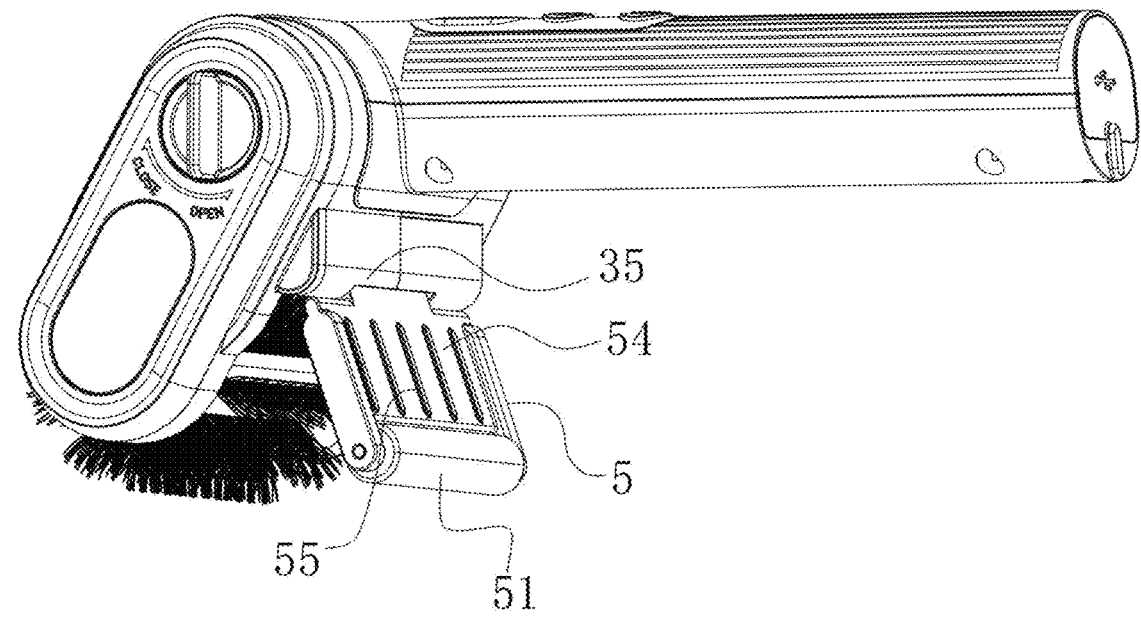
FIG. 2 is another three-dimensional structural diagram of the present disclosure, which has a different view direction from a view direction of FIG. 1.

The following clearly and completely describes the technical solutions in the embodiments of the present disclosure with reference to the accompanying drawings in the embodiments of the present disclosure. Apparently, the described embodiments are some of the embodiments of the present disclosure rather than all the embodiments. All other embodiments obtained by a person of ordinary skill in the art based on the embodiments of present disclosure without making creative efforts shall fall within the protection scope of present disclosure.

Referring to FIG. 1 to FIG. 11, an electric cleaning brush includes a brush head 1, a spinning driving assembly 2, and a brush main body 3 with a grip part 4.

The grip part 4 is suitable for being held by a user, making it convenient to manually operate the electric cleaning brush. For example, the grip part 4 is arranged at a rear end of the brush main body 3.

The brush head 1 is rotatably arranged on the brush main body 3. For example, the brush head 1 is rotatably arranged at a front end of the brush main body 3.

The spinning driving assembly 2 is configured to drive the brush head to spin, so that when the user operates the electric cleaning brush, the brush head 1 driven by the spinning driving assembly 2 can be abutted against a grid-like item such as a barbecue net, and the spinning brush head 1 can clean the grid-like item.

The brush head 1 and the grip part 4 are respectively arranged at the front end and rear end of the brush main body 3, to correspondingly form a spacing distance, thereby effectively avoiding scratching by the spinning brush head when the electric cleaning brush is held for spin-cleaning.

In some embodiments, the brush head 1 includes a shaft-like connector 11 and a contact cleaning member 12 arranged outside the connector. The spinning driving assembly 2 drives the connector 11 to spin, and the contact cleaning member 12 correspondingly follows the connector 11 to spin or is driven by the connector 11 to spin. When a user operates the electric cleaning brush, the spinning contact cleaning member 12 is abutted against a grid-like item such as a barbecue net, and the spinning contact cleaning member 12 is continuously in spinning contact with and performs friction cleaning on the grid-like item, to implement an action of spin-cleaning.

In some embodiments, a length direction of a spinning center line of the connector 11 during spinning overlaps an axis of the connector 11.

As shown in FIG. 1 to FIG. 11, in some embodiments, the contact cleaning member 12 includes a plurality of bristles 122 arranged on the connector 11. The bristles 122 can be bristles made of a metal material for example, to have good hardness and wear resistance. For example, the bristles 122 are made into steel wire structures.

In some embodiments, a bristle connecting portion 123 is arranged on an outer side of the connector 11. One part of the bristles 122 can be correspondingly connected to the bristle connecting portion 123. When the connector 11 spins, the bristles 122 can be driven to spin to clean the grid-like item.

In some embodiments, the bristles 122 have bent cleaning portions 1221. The bent cleaning portions 1221 can correspondingly enlarge a cleaning range during spinning. Furthermore, during cleaning, due to the bendability, the bristles (the parts with the bent cleaning portions) threaded into meshes is favorable for increasing friction of cleaning of a grid-like item, thus cleaning the item more easily.

In some embodiments, the bent cleaning portions 1221 have near ends close to an outer side of the connector and far ends away from the outer side of the connector. Between the near ends of the bent cleaning portions 1221 and the far ends of the bent cleaning portions 1221, the bent cleaning portions 1221 have a plurality of bent sections.

In some embodiments, the bristle connecting portion 123 is configured to clamp and connect the bristles 122 in a clamping manner.

In some embodiments, the bristle connecting portion 123 includes a clamping main body part 1233, and a first clamping wing 1231 and a second clamping wing 1232 that are connected to the clamping main body part; the first clamping wing 1231 is opposite to the second clamping wing 1232; and the first clamping wing 1231 and the second clamping wing 1232 are configured to be mutually clamped to clamp the bristles 122 located between the first clamping wing and the second clamping wing.

In some embodiments, the clamping main body part 1233, the first clamping wing 1231, and the second clamping wing 1232 can be made of, for example, a metal material, to have good clamping and maintenance capabilities. For example, the first clamping wing 1231 and the second clamping wing 1232 are made into iron sheet structures.

In some embodiments, each of the first clamping wing 1231 and the second clamping wing 1232 has a particular width and length. Therefore, when the first clamping wing 1231 and the second clamping wing 1232 are clamped together, they can simultaneously clamp the plurality of bristles.

During clamping, one part of the bristles 122 is sandwiched between the first clamping wing 1231 and the second clamping wing 1232, and another part of the bristles 122 is threaded out between the first clamping wing 1231 and the second clamping wing 1232 and is located outside the bristle connecting portion 123, to clean an item.

In some embodiments, each of the first clamping wing 1231 and the second clamping wing 1232 has a near end connected to the clamping main body part 1233, and a far end away from the clamping main body part 1233. The far end of the first clamping wing 1231 corresponds to the far end of the second clamping wing 1232.

A first clamping head 1234 extending towards the far end of the second clamping wing 1232 is provided at the far end of the first clamping wing 1231; a second clamping head 1235 extending towards the far end of the first clamping wing 1231 is provided at the far end of the second clamping wing 1232; and when the first clamping wing 1231 and the second clamping wing 1232 are mutually clamped, the first clamping head 1234 and the second clamping head 1235 jointly clamp the bristles 122.

In some embodiments, the bristle connecting portion 123 has a length direction extending towards two ends of the connector 11; after the first clamping head 1234 and the second clamping head 1235 are clamped, an internal space of the bristle connecting portion jointly enclosed by the clamping main body part 1233, the first clamping wing 1231, and the second clamping wing 1232 is obtained; and a length direction of the internal space corresponds to the length direction of the bristle connecting portion 123. The length setting allows the bristle connecting portion 123 to simultaneously clamp more bristles.

In some embodiments, a fixed column 1236 is arranged inside the internal space of the bristle connecting portion 123 in a penetrating manner, and a length direction of the fixed column 1236 corresponds to the length direction of the internal space of the bristle connecting portion 123.

One end of each bristle 122 is threaded into the internal space of the bristle connecting portion 123 and is threaded out of the internal space of the bristle connecting portion 123 after bypassing the fixed column 1236. The bristles have winding sections that bypass the fixed column, and two bristle ends that are connected to the winding section and are located outside the internal space of the bristle connecting portion 123. At least one bristle end has a bent cleaning portion.

By the setting of the fixed column 1236 and the bristles 122, after the bristles 122 are clamped, the bristles 122 are less likely to be disconnected.

In some embodiments, a width of the fixed column is greater than a distance between the first clamping head and the second clamping head after the bristles are clamped.

In some embodiments, a connecting portion mounting slot 111 is formed in a peripheral surface of the connector 11; the connecting portion mounting slot 111 has an extending port corresponding to the peripheral surface of the connector 11; the connecting portion mounting slot 111 extends towards an end portion of the connector 11 and penetrates through an end surface of the end portion of the connector 11, to form a connecting portion mounting port; and a necking portion 112 is arranged at a circumferential edge of the extending port. The necking portion 112 is, for example, integrally formed on the connector. The necking portion 112 causes a width of the extending port to be less than a width of an inside of the connecting portion mounting slot 111.

The bristle connecting portion 123 is inserted into the connecting portion mounting slot 111 from a connecting portion mounting port. The bristles 122 connected to the bristle connecting portion 123 extend out of the peripheral surface of the connector 11 through the extending port.

The necking portion 112 is configured to restrict the bristle connecting portion 123, to prevent the bristle connecting portion 123 from being disconnected from the extending port.

In some embodiments, an inner wall of the connecting portion mounting slot 111 is further configured to play a supporting role on the first clamping wing 1231 and the second clamping wing 1232. That is, after the bristle connecting portion 123 is inserted into the connecting portion mounting slot 111, the inner wall of the connecting portion mounting slot 111 can support the first clamping wing 1231 and the second clamping wing 1232 during spin-cleaning, to restrict the clamping opening degrees of the first clamping wing 1231 and the second clamping wing 1232 from becoming too large. Therefore, during high-speed spin-cleaning, the bristles 122 that are subject to cleaning friction can still be well maintained on the bristle connecting portion 123.

In some embodiments, a length direction of the connecting portion mounting slot 111 is the same as an axial direction of the connector 11.

In some embodiments, a plurality of connecting portion mounting slots 111 are spaced apart and arranged on a peripheral surface of the connector 11 in a circumferential direction of the connector 11, and corresponding bristle connecting portions 123 are arranged in the connecting portion mounting slots 111.

By inserting the bristle connecting portions 123, each part (in the corresponding bristle connecting portion) of the bristles can be separately removed from the brush head, which is more conducive to thoroughly cleaning the brush head 1 and separately replacing each part of the bristles.

Figure 3:
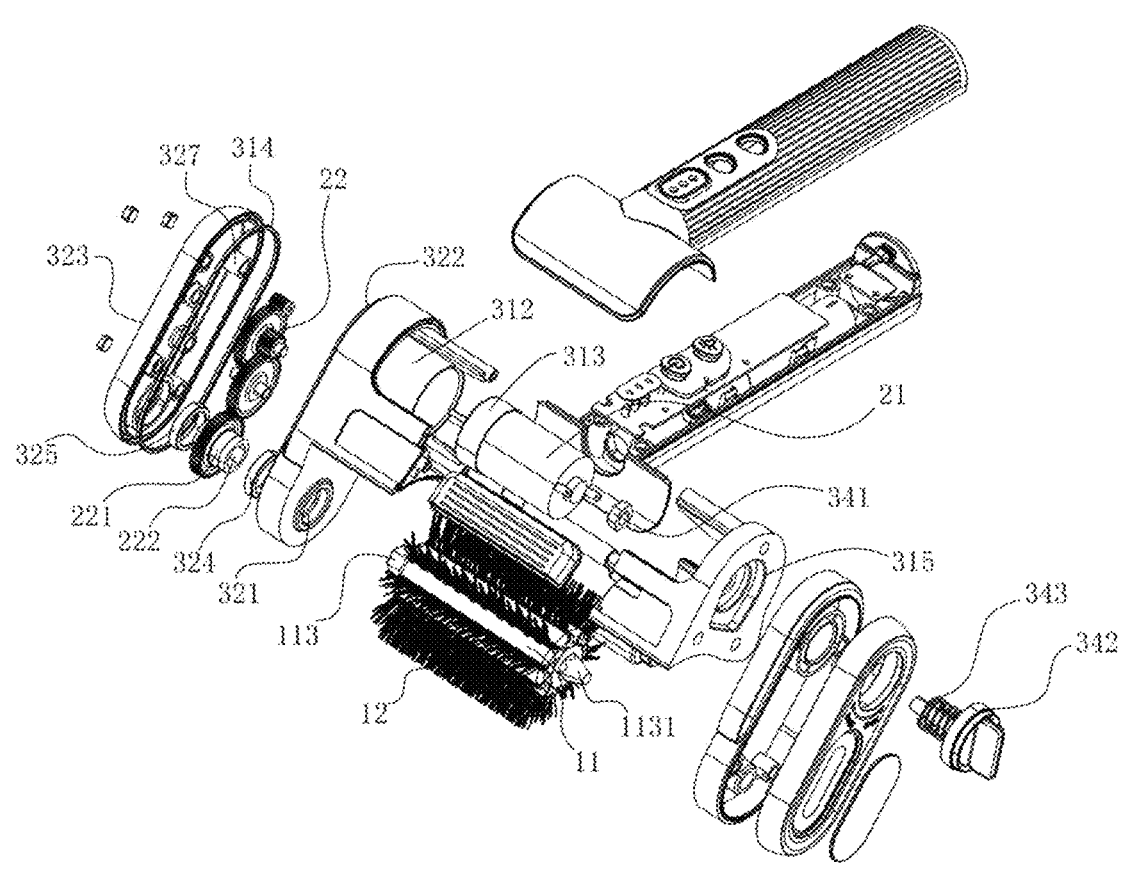
FIG. 3 is a structural exploded view of the present disclosure.
Figure 4:
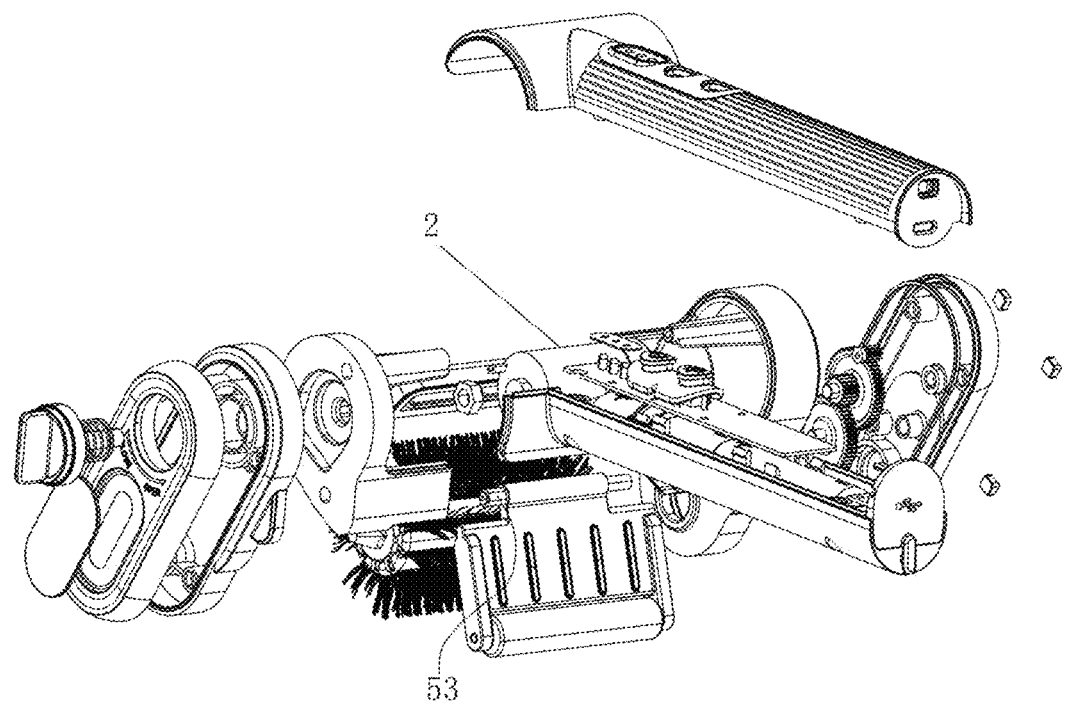
FIG. 4 is another structural exploded view of the present disclosure, which has a different view direction from a view direction of FIG. 3.
Figure 5:
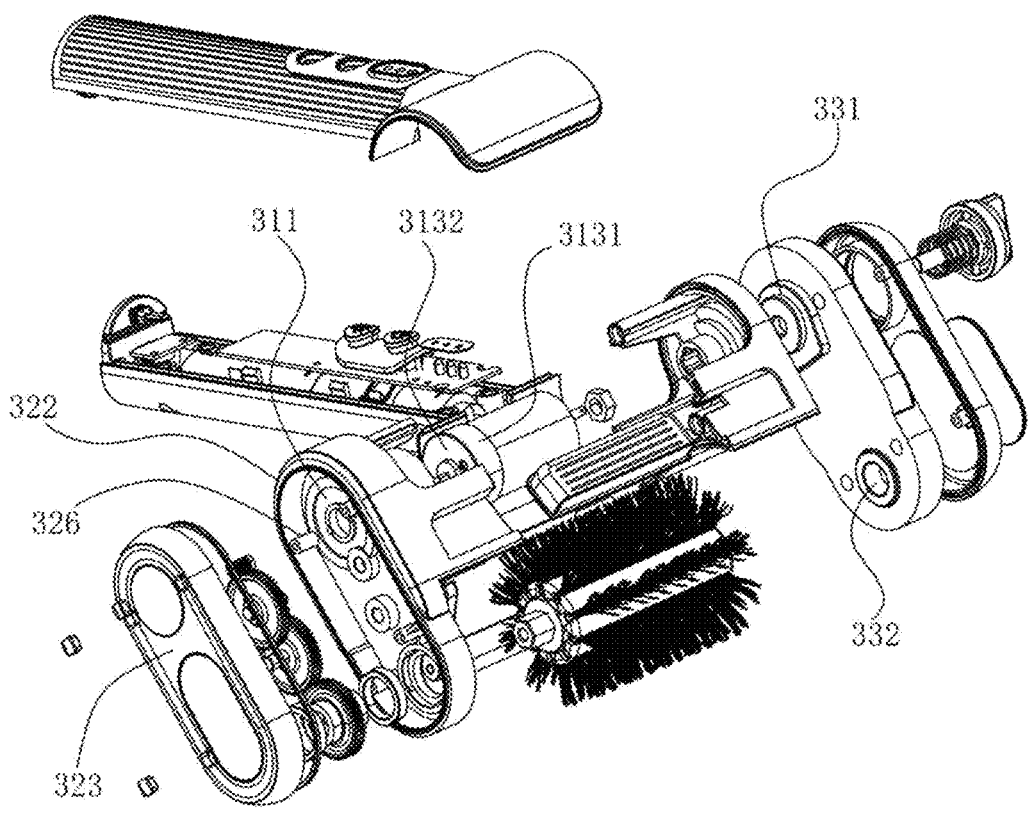
FIG. 5 is still another structural exploded view of the present disclosure, which has a different view direction from view directions of FIG. 3 and FIG. 4.
Figure 6:
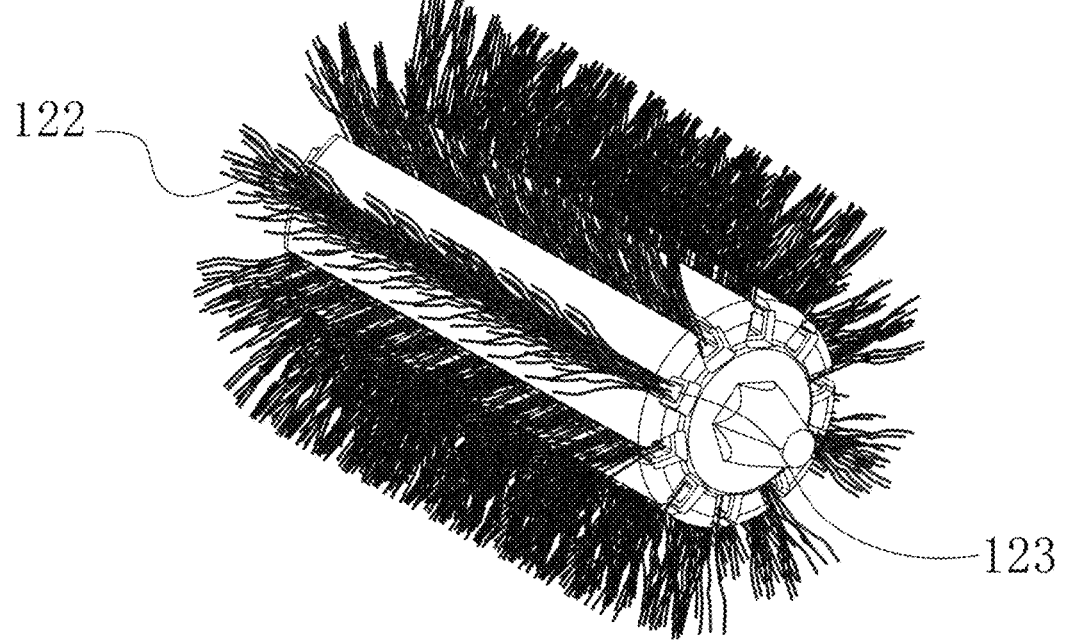
FIG. 6 is a three-dimensional structural diagram of a brush head of the present disclosure, in which a brush head has bristles.
Figure 7:
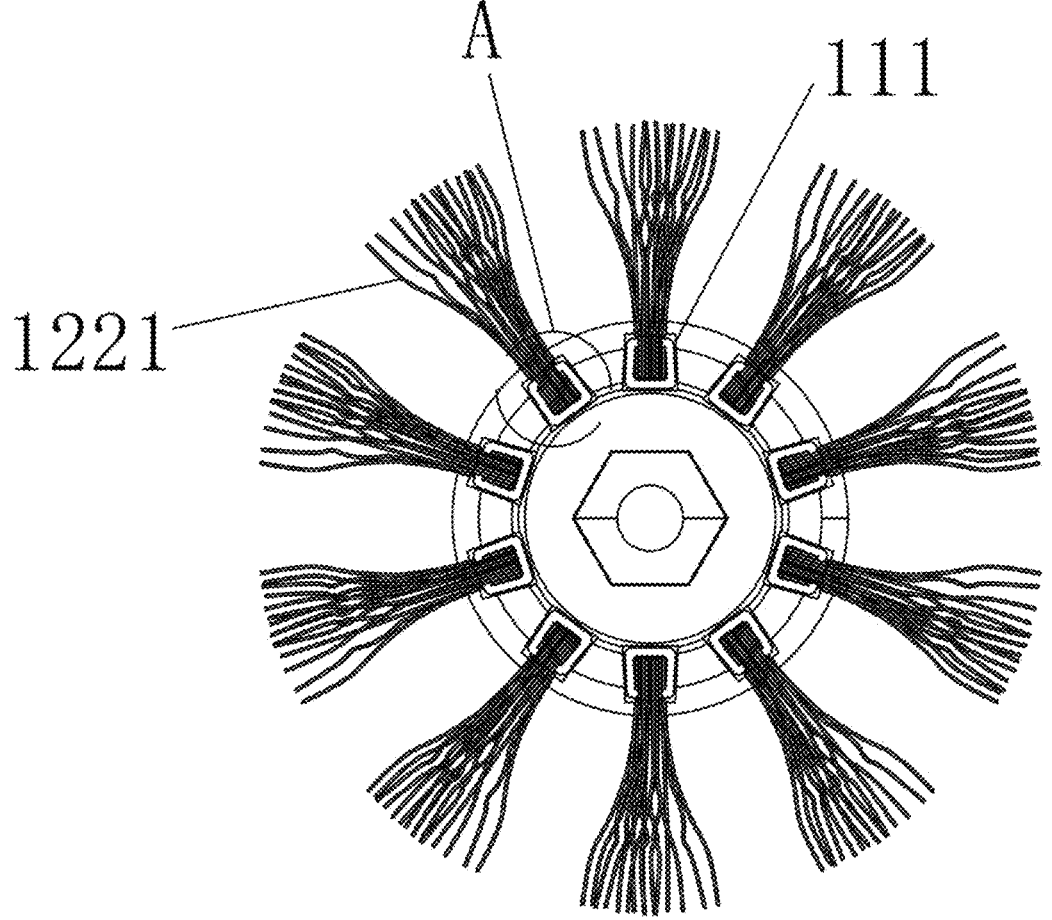
FIG. 7 is a structural side view of a brush head of the present disclosure, in which a brush head has bristles.
Figure 8:
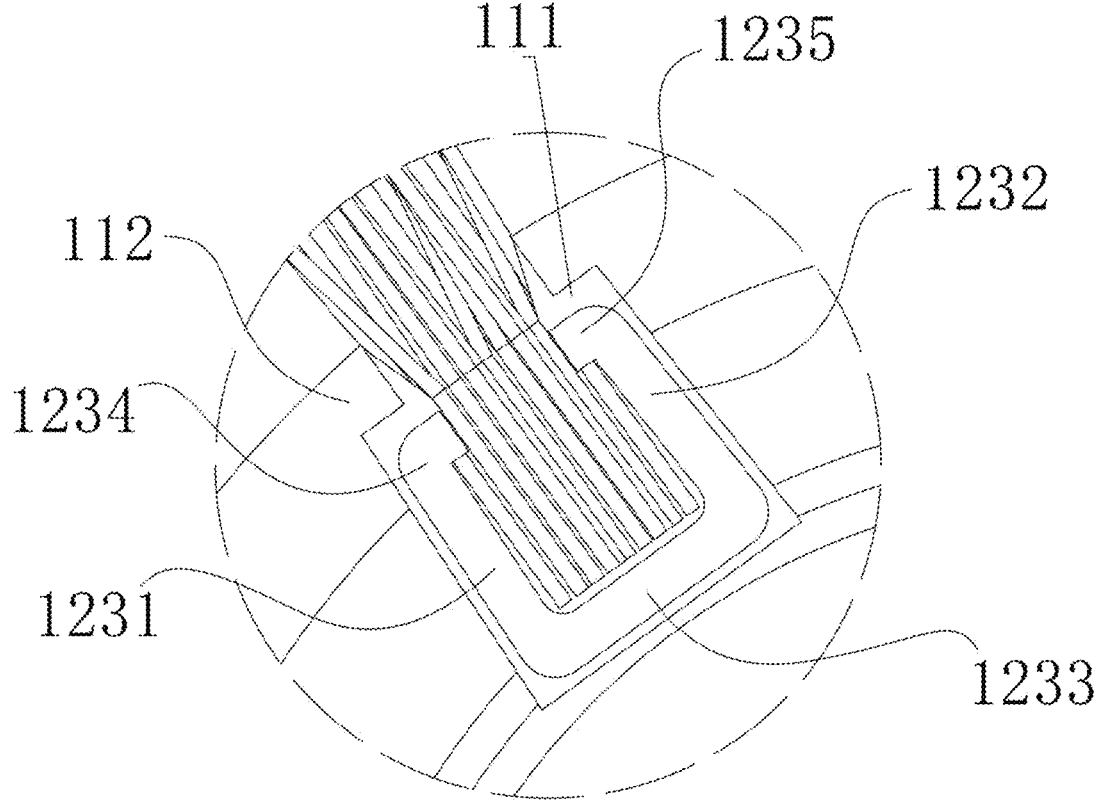
FIG. 8 is a partially structural enlarged view of part A in FIG. 7.
Figure 9:
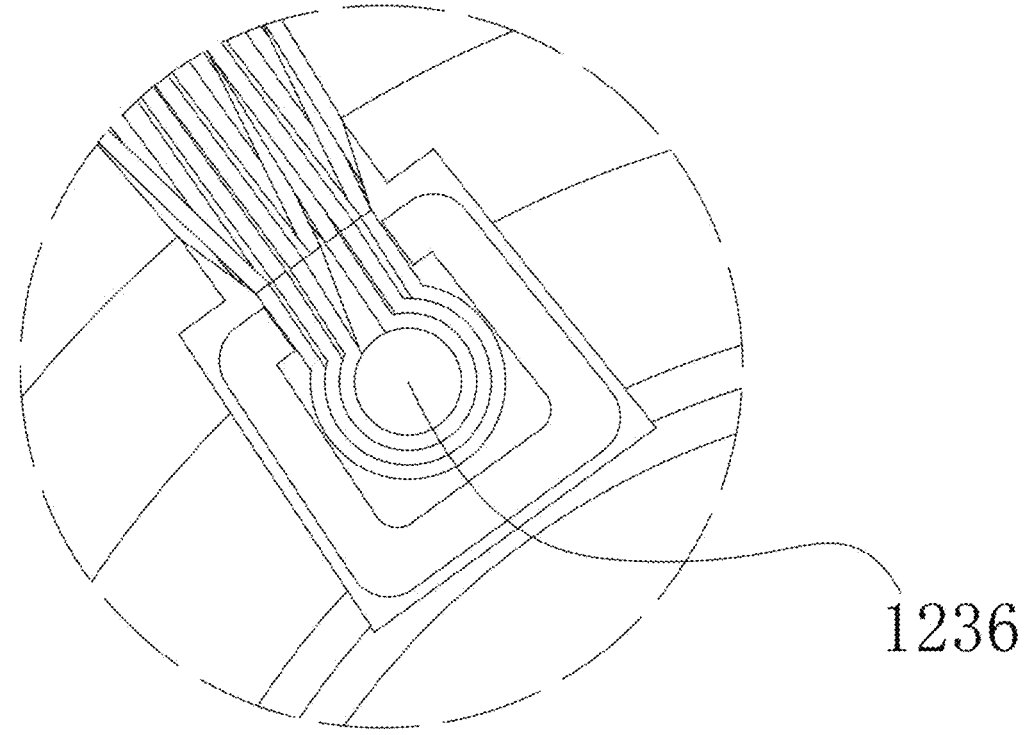
FIG. 9 is another partially structural enlarged view of part A in FIG. 8. Compared with FIG. 7, a fixed column is provided.

In some embodiments, the brush main body 3 includes a base portion 31, and a first connecting arm 32 and a second connecting arm 33 that are arranged on two sides of the base portion 31. The base portion 31, the first connecting arm 32, and the second connecting arm 33 jointly form a mounting position for mounting the brush head. As shown in FIG. 1 and FIG. 3, the first connecting arm 32 and the second connecting arm 33 are located on two sides of the base portion 31 corresponding to the axial direction of the connector 11.

In some embodiments, the first connecting arm 32 and the base portion have a communicated inner cavity. The spinning driving assembly 2 includes a driving motor 21 arranged in the inner cavity, and the driving motor 21 is configured to drive the brush head 1 to spin.

In some embodiments, the spinning driving assembly 2 further includes a transmission assembly 22 arranged in the inner cavity. Spinning output by the driving motor 21 is transmitted to the brush head 1 through the transmission assembly 22, thereby driving the brush head 1 to spin.

In some embodiments, the transmission assembly 22 includes a gear set. The gear set is configured to: accelerate or decelerate the spinning of the driving motor 21 and then transmit the spinning to the brush head 1. Correspondingly, the gear set for acceleration can also be referred to as an acceleration gear set. Correspondingly, the gear set for deceleration can also be referred to as a deceleration gear set.

In some embodiments, the gear set can employ a deceleration gear set to output the high-speed spinning of the driving motor 21 in a decelerated manner based on a ratio of tooth numbers of different gears in the deceleration gear set. For example, a spinning output of 18000 revolutions per minute can be decelerated to about 700 revolutions per minute. An output torque is increased through the deceleration gear set, so that the brush head 1 can obtain a higher torque and more powerfully brush away bonding solids in a net, such as carbon coke formed by food sintering on a barbecue net.

In some embodiments, the connector 11 is connected with an output rotating shaft 113. The driving motor 21 directly drives the output rotating shaft or drives the output rotating shaft 113 through the above transmission assembly 22, thereby driving the brush head 1 to spin.

In some embodiments, two ends of the output rotating shaft 113 can be correspondingly supported by the first connecting arm 32 and the second connecting arm 33 respectively, or it is understood that the two ends of the output rotating shaft 113 are respectively in rotating fit with the first connecting arm 32 and the second connecting arm 33, thus providing good rotation stability during cleaning.

In some embodiments, the transmission assembly 22 includes a connecting shaft 221 rotatably arranged in the inner cavity of the first connecting arm 32. An axial direction of the connecting shaft 221 is the same as an axial direction of the output rotating shaft 113. One end of the connecting shaft 221 is engaged with one end of the output rotating shaft 113, to enable an axis of the connecting shaft 221 overlap an axis of the output rotating shaft 113.

In some embodiments, when the transmission assembly 22 includes the gear set, the connecting shaft 221 may be a rotating shaft on a last stage of gear of the gear set.

In some embodiments, one end of the connecting shaft 221 and one end of the output rotating shaft 113 may be engaged in a plugged manner.

For example, an axial plugging slot 222 is formed in an end surface of one end of the connecting shaft 221, and a radial cross section of the axial plugging slot 222 is non-circular. A plugging hole 321 communicated with the inner cavity is formed in one side of the first connecting arm 32 facing the mounting position, and the axial plugging slot 222 is exposed through the plugging hole 321. For example, the output rotating shaft 113 is located inside the first connecting arm and an opening of the axial plugging slot faces the plugging hole, so that the connecting shaft can be in contact with the axial plugging slot located inside the first connecting arm through the plugging hole. For another example, one end of the connecting shaft is located in the plugging hole and the axial plugging slot in one end of the connecting shaft directly faces an external opening of the plugging hole. For still another example, one end of the connecting shaft extends to the plugging hole for transmission, so that an opening of the axial plugging slot is located outside the first connecting arm.

One end of the output rotating shaft 113 corresponds to the axial plugging slot 222. One end of the output rotating shaft 113 can be correspondingly plugged into the axial plugging slot 222.

A radial cross section of one end of the output rotating shaft 113 is also correspondingly non-circular, so that the output rotating shaft 113 can be quickly engaged with the connecting shaft 221 in a plugged manner and be driven to rotate by the connecting shaft 221.

In some embodiments, a mounting port 322 communicated with the inner cavity is formed in one side of the first connecting arm 32 facing away from the mounting position, and the first connecting arm 32 is detachably connected with a sealing cover 323 for covering the mounting port. During mounting or maintenance, the sealing cover 323 can be removed to facilitate the above operations on the inside of the first connecting arm 32.

In some embodiments, a direction in which the sealing cover 323 covers the mounting port 322 is the same as the axial direction of the connecting shaft 221. In this way, the sealing cover 323 can also be configured to provide further supporting for a rotating component inside the first connecting arm 32. For example, one end of the connecting shaft 221 is supported by the first connecting arm 32, and another end of the connecting shaft 221 is correspondingly supported by the sealing cover 323 that covers the first connecting arm, so that after the sealing cover 323 is removed, it is more convenient to inspect and maintain a rotating component inside.

In some embodiments, when the transmission assembly 22 includes a gear set, the sealing cover 323 can also be configured to provide further supporting for a rotating shaft of a gear.

In some embodiments, the sealing cover 323 and the first connecting arm 32 are used as supporting components for the connecting shaft 221. A second hard stabilizing ring 325 that cooperates with the connecting shaft 221 is arranged on the sealing cover 323. A first hard stabilizing ring 324 that cooperates with the connecting shaft 221 is arranged on the first connecting arm 32. One end of the connecting shaft 221 is correspondingly plugged into the first hard stabilizing ring 324 and is in rotating fit with the first hard stabilizing ring 324. When the sealing cover 323 covers the first connecting arm 32, the second hard stabilizing ring 325 correspondingly sleeves another end of the connecting shaft 221 and is in rotating fit with the connecting shaft 221.

The first hard stabilizing ring 324 and the second hard stabilizing ring 325 are, for example, metal rings, and have stable lengths in the axial direction. After the connecting shaft 221 is engaged with the output rotating shaft 113, the first hard stabilizing ring 324 and the second hard stabilizing ring 325 can provide hard supporting for the connecting shaft 221.

In some embodiments, a mounting rack 311 is arranged in the base portion 31. The mounting rack 311 has a cylindrical motor fixing seat 312.

The mounting rack 311 and the motor fixing seat 312 are spaced apart in a communicated space of the first connecting arm 32 and the base portion 31, and the first connecting arm 32 is communicated to the inside of the base portion 31 through a cylinder opening of the cylindrical motor fixing seat 312.

The driving motor 21 is threaded into the motor fixing seat 312, and an output shaft of the driving motor 21 is threaded into the inner cavity of the first connecting arm 32 through the cylinder opening of the motor fixing seat 312, so as to drive the brush head 1 through the above transmission assembly 22.

In some embodiments, a shock absorption sleeve 313 is arranged inside the motor fixing seat 312. The shock absorption sleeve 313 is located between the motor fixing seat 312 and a shell of the driving motor 21. The shock absorption sleeve 313 is configured to sleeve the shell of the driving motor.

In some embodiments, the shock absorption sleeve 313 includes a shock absorption sleeve main body 3131 that sleeves a peripheral surface of the driving motor 21, and further includes a shock absorption sleeve wrapping portion 3132 that extends to wrap around an end cover of the output shaft of the driving motor 21. The shock absorption sleeve wrapping portion 3132 corresponds to a shaft threading opening. This better reduces noises while achieving a good shock absorption effect.

In some embodiments, the shock absorption sleeve 313 can be made of an elastic plastic material such as silicone or rubber.

In some embodiments, a sealing ring 314 is arranged at a covering edge of the sealing cover 323 that cooperates with the first connecting arm 32. After covering, the sealing ring 314 can effectively reduce transferring of noise from the inside the first connecting arm 32.

In some embodiments, an axial connecting stud 326 is arranged inside the first connecting arm 32. A positioning connecting sleeve 327 that cooperates with the axial connecting stud is arranged on an inner side of the sealing cover 323 corresponding to the inner cavity of the first connecting arm 32. A screwing hole corresponding to the positioning connecting sleeve 327 is formed in an outer side of the sealing cover 323.

The sealing cover 323 directionally covers the first connecting arm 32 through positioning sleeving of the positioning connecting sleeve 327 and the axial connecting stud 326. The sealing cover 323 is connected to the axial connecting stud 326 by threading a configured screw through the screwing hole, to form a detachable connection with a positioning effect.

In some embodiments, the second connecting arm 33 has a first state and a second state relative to the base portion 31, and the first state and the second state are switchable. In the first state, the second connecting arm 33 can be configured to perform disconnection resistance against the output rotating shaft 113 plugged on the connecting shaft. In the second state, the second connecting arm 33 can be configured to perform disconnection resistance against the output rotating shaft 113 plugged on the connecting shaft.

By the first state and the second state that are switchable, the brush head 1 can be set to be detachably connected to the brush main body 3, that is, the engagement between the output rotating shaft 113 and the connecting shaft 221 is detachable.

In some embodiments, when the second connecting arm 33 is configured to perform disconnection resistance against the output rotating shaft 113 inserted on the connecting shaft, the second connecting arm 33 can simultaneously support the output rotating shaft 113, that is, be in rotating fit with the output rotating shaft 113.

In some embodiments, a locking assembly 34 is arranged between the second connecting arm 33 and the base portion 31. The locking assembly 34 is configured to lock the second connecting arm 33 onto the base portion 31 when the second connecting arm 33 is in the first state. The locking assembly 34 is further configured to unlock the second connecting arm 33 locked on the base portion, so that the second connecting arm 33 can switch to the second state.

In some embodiments, the second connecting arm 33 is detachably connected to the base portion 31. The first state corresponds to a connected state, and the second state corresponds to a removed state.

In some embodiments, the locking assembly 34 includes a screwing portion 341 located on a side portion of the base portion 31, and a screwing fitting piece 342 located on the second connecting arm 33. The screwing portion 341 and the screwing fitting piece 342 can be in screwing fit.

After the second connecting arm 33 approaches the base portion 31, the second connecting arm 33 can be connected to the base portion 1 through screwing connection between the screwing portion 341 and the screwing fitting piece 342.

Specifically, the screwing portion 341 is a structural member with a screw hole, such as a screw hole column or a nut, on the base portion. The structural member is restricted from being disconnected from the base portion in a direction close to the second connecting arm. For example, the screw hole column is integrally formed on the base portion. For another example, a limiting frame for limiting the nut is arranged on the base portion.

The screwing fitting piece 342 is, for example, a knob with a screw rod portion and a cap portion. The second connecting arm has a connecting hole corresponding to a screw hole of the screwing portion. The screw rod portion of the knob passes through the connecting hole and is screwed on the screwing portion, and the cap portion of the knob presses the second connecting arm against the base portion.

In some embodiments, a first elastic member 343 is arranged between the knob and the second connecting arm 33. When the screw rod portion of the knob is screwed with the screwing hole of the screwing portion, the first elastic member 343 undergoes elastic deformation under the joint action of the knob and the second connecting arm 33. By the arrangement of the first elastic member 343, the connection is more stable and less prone to loosening, especially when the second connecting arm 33 supports the output rotating shaft 113, which can effectively avoid loosening of screwing.

In some embodiments, the first elastic member 343 includes a compression spring sleeving the screw rod portion of the knob.

In some embodiments, at a mutually contact position between the second connecting arm 33 and the base portion 31, the base portion 31 has a supporting arm positioning portion 315, and the second connecting arm 33 has a supporting arm positioning fitting portion 331. The positioning fit between the supporting arm positioning portion 315 and the supporting arm positioning fitting portion 331 ensures that rotation displacement is avoided after the second connecting arm 33 is screwed and pressed, thereby better limiting and supporting the brush head 1.

In some embodiments, one end of the output rotating shaft 113 corresponding to the second connecting arm has a conical end surface 1131, and the second connecting arm 33 is provided with a conical hole 332 that matches the conical end surface. Based on a slope characteristic of the conical end surface 1131, it is easier for the second connecting arm 33 to align and support the output rotating shaft 113. Furthermore, during removal of the second connecting arm, it is easier to separate the second connecting arm 33 from the output rotating shaft 113.

In some embodiments, the output rotating shaft 113 and the connector 11 are detachably connected. For example, the connector 11 is provided with a central axis hole in a penetrating manner, and the output rotating shaft 113 is correspondingly threaded through the central axis hole, which can be understood as that the connector 11 being sleeved on sleeves the output rotating shaft 113. In this way, the brush head 1 has a plurality of components capable of being removed separately, including the output rotating shaft 113, the connector 11, and the contact cleaning piece 12, which further reduces the replacement costs of the brush head 1, to perform targeted replacement on a damaged component and facilitate comprehensive cleaning on the brush head 1.

In some embodiments, a radial cross section of the central axis hole is non-circular, and a radial cross section of a shaft section of the output rotating shaft 113 inserted into the central axis hole is correspondingly non-circular, so that the output rotating shaft 113 can better drive the connector 11 to spin. The non-circular shape is, for example, a regular hexagon.

In some embodiments, the brush main body 3 is further provided with a supporting member 5. The supporting member 5 is arranged on the brush main body 3 and is located behind the brush head 1. The supporting member 5 is configured to be located between the brush head 1 and the grip part 4. When a user holds the grip part 4 and presses the brush head 1 towards a grid-like item, the supporting member 5 can correspondingly support the grid-like item and form a force-bearing fulcrum, so that the user can better maintain the stability and balance of the electric cleaning brush.

In some embodiments, the supporting member 5 has a near end connected to the brush main body 3, and a far end that is in contact with and supports a grid-like item; and a roller 51 that is in contact with the grid-like item is arranged at the far end of the supporting member 5.

In some embodiments, an axial direction of the roller 51 on the supporting member 5 is the same as an axial direction of the brush head 1. When the electric cleaning brush moves back and forth to brush a net, the arrangement of the roller 51 allows the supporting member 5 to better implement supporting during moving.

In some embodiments, the near end of the supporting member 5 is movably connected to the brush main body 3. The supporting member 5 moves on the brush main body 3, so that a supporting opening degree provided by the supporting member 5 is variable.

The supporting opening degree indicates that when the brush head 1 is in contact with an item and the supporting member 5 supports the item, a degree to which the grip part 4 approaches the item or inclination of the grip part 4 changes correspondingly when the supporting member 5 is in different movement positions.

In some embodiments, the supporting member 5 is movably connected to the brush main body 3, for example, in a rotatable connection manner, so that the supporting opening degree provided by the supporting member 5 is variable by spinning the supporting member 5.

For example, a rotary connecting portion 52 is arranged at the near end of the supporting member 5, and a rotary fitting portion (not shown) is correspondingly arranged on the brush main body 3. The near end of the supporting member 5 is rotatably connected to the brush main body 3 through cooperation between the rotary connecting portion 52 and the rotary fitting portion.

For example, the rotary connecting portion 52 is a rotating shaft, and the rotary fitting portion is a rotating shaft seat that matches the rotating shaft.

When the supporting opening degree provided decreases, it can be understood that spinning is performed until the far end of the supporting member 5 is closer to the brush head 1. When the supporting opening degree provided increases, it can be understood that spinning is performed until the far end of the supporting member 5 is farther away from the brush head 1.

In some embodiments, a rotation amount limiting portion 35 is further arranged on the brush main body 3, to limit a rotation amount of the supporting member 5, thereby limiting and obtaining a minimum supporting opening degree and a maximum supporting opening degree.

At the minimum supporting opening degree, the supporting member 5 is in no contact with the brush head 1 or it is understood that there is a redundancy gap between the supporting member 5 and the brush head 1, to avoid the supporting member 5 from affecting the spinning of the brush head 1. At the maximum supporting opening degree, the supporting member 5 is in no contact with the grip part 4 or it is understood that there is still a safe distance between the supporting member 5 and the grip part 4, to avoid the supporting member 5 from hitting a hand with which the user holds the grip part 4.

In some embodiments, a second elastic member 53 is further arranged between the supporting member 5 and the brush main body 3.

When the supporting member 5 moves until the supporting opening degree increases, the second elastic member 53 undergoes elastic deformation or undergoes aggravated elastic deformation under the joint action of the supporting member 5 and the brush main body 3. In this way, after an external force is withdrawn, the second elastic member 53 can apply an elastic force to the supporting member 5, thereby causing the supporting member 5 to move until the supporting opening degree decreases. That is, the second elastic member 53 can provide kinetic energy for movement of the supporting member 5 after undergoing the elastic deformation.

Figure 11:
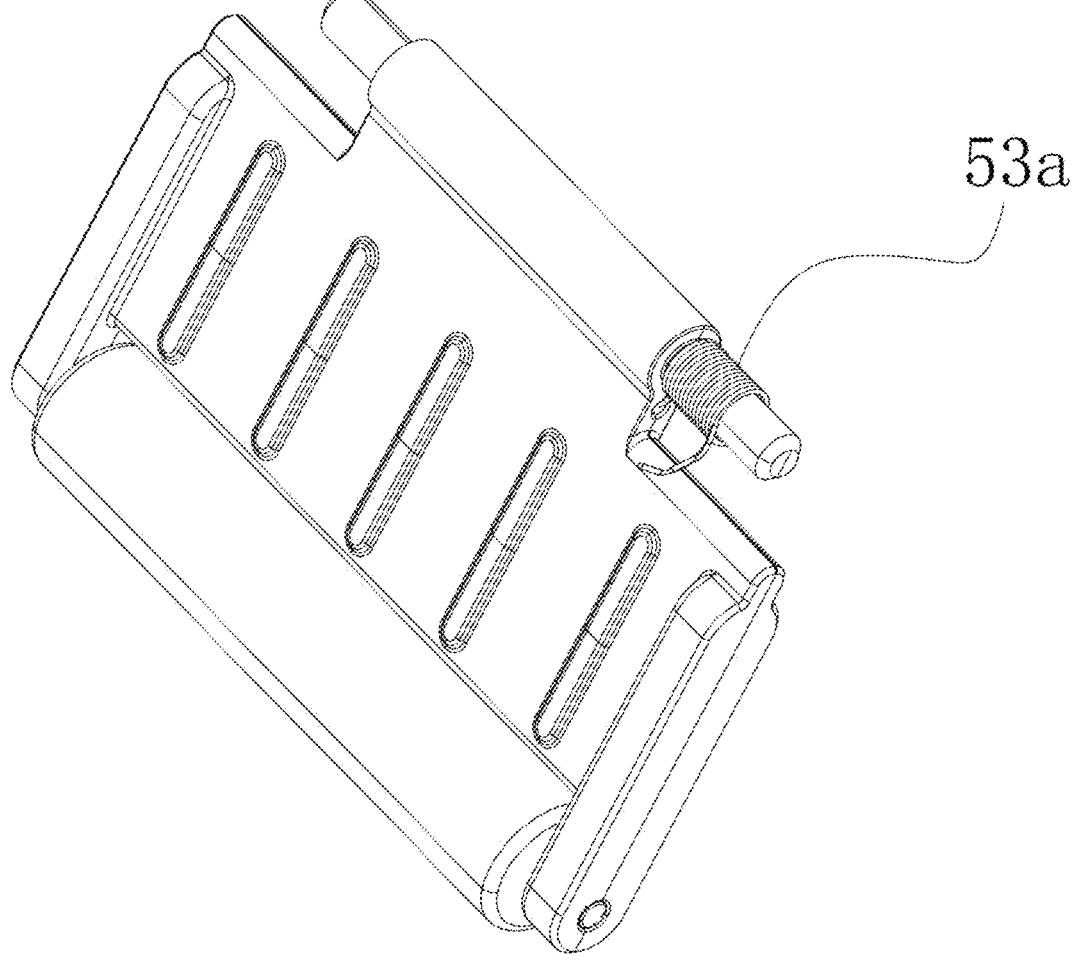
FIG. 11 is another schematic structural diagram of a supporting member and a second elastic member of the present disclosure, in which the second elastic member includes a torsional spring.

As shown in FIG. 11, in some embodiments, when the supporting member 5 is rotatably connected to the brush main body 3, the second elastic member 53 may include, for example, a torsional spring 53a. When the supporting member 5 rotates until the supporting opening degree increases, two force bearing ends of the torsional spring 53a are respectively pressed by the supporting member 5 and the brush main body 3, so that the torsional spring 53a undergoes torsional deformation or even greater torsional deformation.

Figure 10:
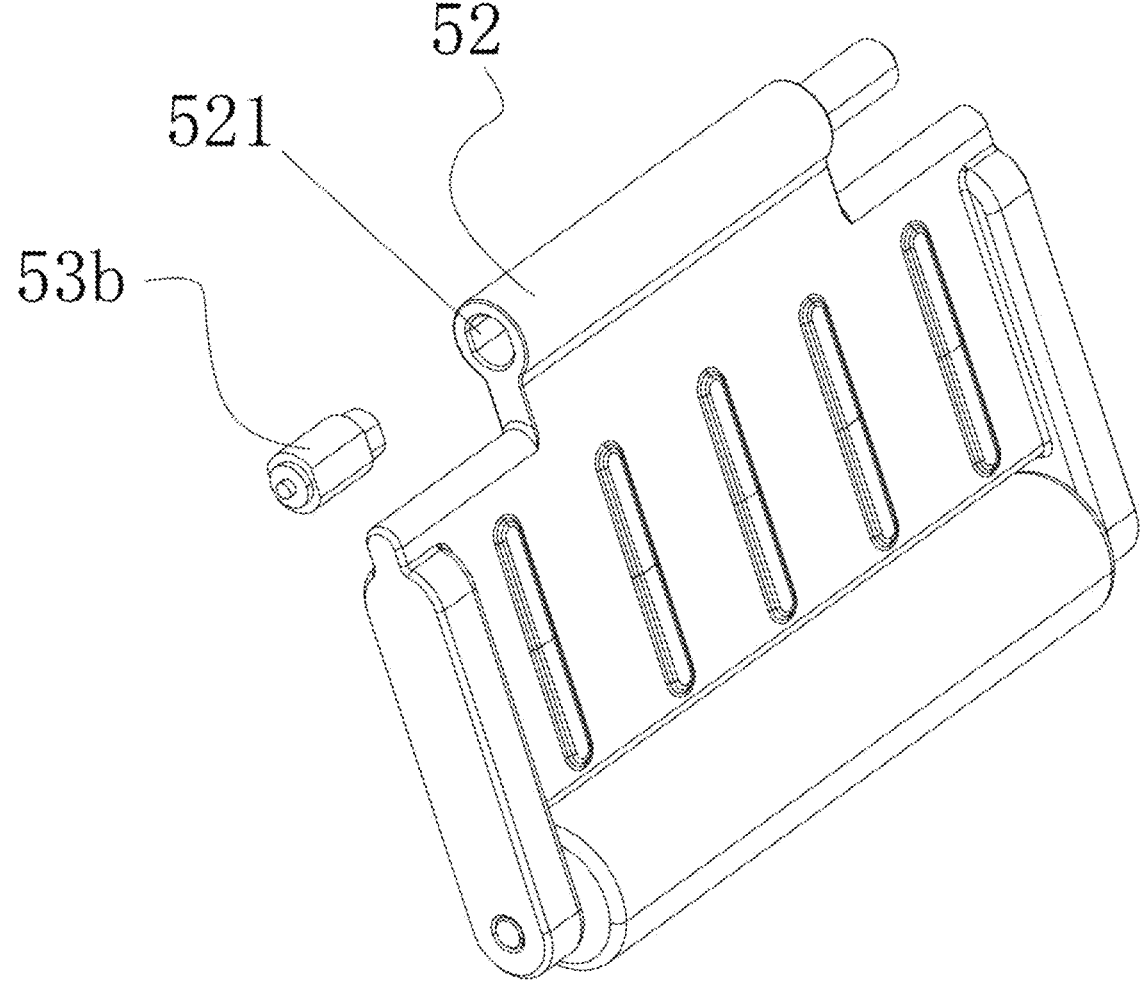
FIG. 10 is a schematic structural diagram of a supporting member and a second elastic member of the present disclosure, in which the second elastic member includes an elastic rotating shaft.

As shown in FIG. 10, in some embodiments, when the supporting member 5 is rotatably connected to the brush main body 3, the second elastic member 53 may include, for example, an elastic rotating shaft 53b. The elastic rotating shaft 53b is arranged between the rotary connecting portion 52 and the rotary fitting portion. Specifically, for example, each of the rotary connecting portion 52 and the rotary fitting portion has a mounting slot 521. An outer sleeve of the elastic rotating shaft 53b is plugged into the mounting slot of the rotary fitting portion in a positioning manner, and a rotating block of the elastic rotating shaft 53b is plugged into the mounting slot of the rotary connecting portion 52 in a positioning manner. When the supporting member 5 rotates until the supporting opening degree increases, the elastic rotating shaft 53b is subjected to joint action of the rotary connecting portion 52 and the rotary fitting portion, and an internal elastic component of the elastic rotating shaft 53b correspondingly undergoes elastic deformation or greater elastic deformation.

By the setting of a variable opening degree and the arrangement of the second elastic member 53, on the one hand, a better shock absorption effect can be provided during supporting performed by the supporting member 5, and on the other hand, when the supporting member 5 implements supporting during movement, the electric cleaning brush can better cross an uneven position in conjunction with the roller 51, so that being stuck does not easily occur when the supporting member 5 implements supporting during movement. In addition, when a user holds the grip part 4 and presses it down, the inclination of the grip part 4 can be adjusted within a supporting opening degree range to adjust an exerted force.

In some embodiments, an antisplash part 54 is arranged on the supporting member 5. The antisplash part 54 is configured to fend against water or particulate matters, so as to reduce the water or the particulate matters from splashing to the grip part behind or a user behind.

In some embodiments, the supporting member 5 is provided with a plurality of reinforcing ribs 55 to further enhance the supporting strength of the supporting member 5.

In some embodiments, the reinforcing ribs 55 are arranged on one side of the supporting member 5 away from the brush head 1 to prevent water or particulate matters splashing out of the brush head from being directly adhered to corner seams formed by the reinforcing ribs.

In some embodiments, the supporting member 5 can be, for example, a structural member that is made of a metal material, a hard plastic material, or the like and has high supporting strength.

In some embodiments, when the supporting member 5, the second elastic member 53, and the brush head 1 with the bristles are simultaneously provided, and the brush head 1 has the bristle connection portion 123 extending towards two ends of the connector 11, the driving motor 21 has a rotary outputting state for driving the brush head 1 to backwards brush a grid-like item, that is, the brush head 1 has a spin-cleaning state of backward brushing. When the brush head performs backward brushing, the brush head spins clockwise on the brush main body in the same spinning direction as a rotation direction of the supporting body on the brush main body from the minimum supporting opening degree to the maximum supporting opening degree. Meanwhile, the bristles 122 for backward brushing and the supporting member 5 provided with kinetic energy by the second elastic member 53 can simultaneously achieve a clamping effect on a grid-like item, so that the cleaning effect is better.

For those skilled in the art, it is apparent that the present disclosure is not limited to the details of the exemplary embodiments mentioned above, and can be implemented in other specific forms without departing from the spirit or basic features of the present disclosure. Therefore, in any perspective, the embodiments should be regarded as exemplary and non-restrictive. The scope of the present disclosure is limited by the accompanying claims rather than the above description. Therefore, all changes within the meaning and scope of the equivalent conditions of the claims within the present disclosure. Any reference numerals in the claims should not be regarded as limiting the claims involved.

What is claimed is:

1. An electric cleaning brush using a bristle brush for cleaning, comprising a brush head, a spinning driving assembly, and a brush main body, wherein the brush head is rotatably arranged on the brush main body; the spinning driving assembly is configured to drive the brush head to spin; the brush head comprises a shaft-like connector; a bristle connecting portion is arranged on an outer side of the connector; the bristle connecting portion is connected with a plurality of bristles; and the bristle connecting portion is configured to clamp and connect bristles in a clamping manner;

wherein the brush main body has a grip part; the brush head is rotatably arranged at a front end of the brush main body; the grip part is arranged at a rear end of the brush main body; the brush main body is further provided with a supporting member; the supporting member is arranged on the brush main body and is located behind the brush head; the supporting member is located between the brush head and the grip part; the supporting member has a near end connected to the brush main body, and a far end that is in contact with and supports an item to be cleaned; and a roller that is in contact with the item to be cleaned is arranged at the far end of the supporting member;

wherein the near end of the supporting member is movably connected to the brush main body, and the supporting member moves on the brush main body to form a variable supporting opening degree provided by the supporting member.

2. The electric cleaning brush according to claim 1, wherein the bristle connecting portion comprises a clamping main body part, and a first clamping wing and a second clamping wing that are connected to the clamping main body part; the first clamping wing is opposite to the second clamping wing; the first clamping wing and the second clamping wing are configured to be mutually clamped to clamp the bristles located between the first clamping wing and the second clamping wing; and during clamping, one part of the bristles is sandwiched between the first clamping wing and the second clamping wing, and another part of the bristles is threaded out between the first clamping wing and the second clamping wing and is located outside the bristle connecting portion.

3. The electric cleaning brush according to claim 2, wherein each of the first clamping wing and the second clamping wing has a near end connected to the clamping main body part, and a far end away from the clamping main body part; a far end of the first clamping wing corresponds to a far end of the second clamping wing;

a first clamping head extending towards the far end of the second clamping wing is provided at the far end of the first clamping wing; a second clamping head extending towards the far end of the first clamping wing is provided at the far end of the second clamping wing; and when the first clamping wing and the second clamping wing are mutually clamped, the first clamping head and the second clamping head are configured to jointly clamp the bristles.

4. The electric cleaning brush according to claim 3, wherein the bristle connecting portion has a length direction extending towards two ends of the connector; after the first clamping head and the second clamping head are clamped, an internal space of the bristle connecting portion jointly enclosed by the clamping main body part, the first clamping wing, and the second clamping wing is obtained; and a length direction of the internal space of the bristle connecting portion corresponds to the length direction of the bristle connecting portion.

5. The electric cleaning brush according to claim 4, wherein a fixed column is arranged inside the internal space in a penetrating manner, and a length direction of the fixed column corresponds to the length direction of the internal space; and the bristles have winding sections that bypass the fixed column, and two bristle ends that are connected to the winding sections and are located outside the internal space.

6. The electric cleaning brush according to claim 5, wherein a width of the fixed column is greater than a distance between the first clamping head and the second clamping head after the bristles are clamped.

7. The electric cleaning brush according to claim 2, wherein a connecting portion mounting slot is formed in a peripheral surface of the connector; the connecting portion mounting slot has an extending port corresponding to the peripheral surface of the connector;

the connecting portion mounting slot extends towards an end portion of the connector and penetrates through an end surface of the end portion of the connector, to form the connecting portion mounting port;

a necking portion is arranged at a circumferential edge of the extending port; the necking portion is configured to cause a width of the extending port to be less than a width of an inside of the connecting portion mounting slot;

the bristle connecting portion is inserted into the connecting portion mounting slot from the connecting portion mounting port; the bristles clamped on the bristle connecting portion extend out of the peripheral surface of the connector through the extending port; and the necking portion is configured to restrict the bristle connecting portion, to prevent the bristle connecting portion from being disconnected from the extending port.

8. An electric cleaning brush using a bristle brush for cleaning, comprising a brush head, a spinning driving assembly, and a brush main body, wherein the brush head is rotatably arranged on the brush main body; the spinning driving assembly is configured to drive the brush head to spin; the brush head comprises a shaft-like connector; a bristle connecting portion is arranged on an outer side of the connector;

the bristle connecting portion is connected with a plurality of bristles; and the bristles have bent cleaning portions;

wherein the brush main body has a grip part; the brush head is rotatably arranged at a front end of the brush main body; the grip part is arranged at a rear end of the brush main body; the brush main body is further provided with a supporting member; the supporting member is arranged on the brush main body and is located behind the brush head; the supporting member is located between the brush head and the grip part; the supporting member has a near end connected to the brush main body, and a far end that is in contact with and supports an item to be cleaned; and a roller that is in contact with the item to be cleaned is arranged at the far end of the supporting member;

wherein the near end of the supporting member is movably connected to the brush main body, and the supporting member moves on the brush main body to form a variable supporting opening degree provided by the supporting member.

9. The electric cleaning brush according to claim 8, wherein the bent cleaning portions have near ends close to an outer side of the connector and far ends away from the outer side of the connector; and > between the near ends of the bent cleaning portions and the far ends of the bent cleaning portions, the bent cleaning portions have a plurality of bent sections.

10. An electric cleaning brush using a bristle brush for cleaning, comprising a brush head, a spinning driving assembly, and a brush main body, wherein the brush head is rotatably arranged on the brush main body; the spinning driving assembly is configured to drive the brush head to spin; the brush head comprises a shaft-like connector; a bristle connecting portion is arranged on an outer side of the connector; the bristle connecting portion is connected with a plurality of bristles; the bristle connecting portion is configured to clamp and connect bristles in a clamping manner; and > the bristles have bent cleaning portions;
> wherein the brush main body has a grip part; the brush head is rotatably arranged at a front end of the brush main body; the grip part is arranged at a rear end of the brush main body; the brush main body is further provided with a supporting member; the supporting member is arranged on the brush main body and is located behind the brush head; the supporting member is located between the brush head and the grip part; the supporting member has a near end connected to the brush main body, and a far end that is in contact with and supports an item to be cleaned; and a roller that is in contact with the item to be cleaned is arranged at the far end of the supporting member;
> wherein the near end of the supporting member is movably connected to the brush main body, and the supporting member moves on the brush main body to form a variable supporting opening degree provided by the supporting member.

11. The electric cleaning brush according to claim 10, wherein the bent cleaning portions have near ends close to an outer side of the connector and far ends away from the outer side of the connector; and > between the near ends of the bent cleaning portions and the far ends of the bent cleaning portions, the bent cleaning portions have a plurality of bent sections.

12. The electric cleaning brush according to claim 10, wherein a rotary connecting portion is arranged at the near end of the supporting member; the brush main body is correspondingly provided with a rotary fitting portion; and > the near end of the supporting member is rotatably connected to the brush main body through cooperation between the rotary connecting portion and the rotary fitting portion.

13. The electric cleaning brush according to claim 12, wherein a spinning axial direction of the roller on the supporting member is the same as both a spinning axial direction of the brush head on the brush main body and a spinning axial direction of the supporting member on the brush main body.

14. The electric cleaning brush according to claim 13, wherein the brush main body is further provided with a rotation amount limiting portion;

> the rotation amount limiting portion is configured to limit a rotation amount of the supporting member, to correspondingly limit and obtain a minimum supporting opening degree and a maximum supporting opening degree;
> at the minimum supporting opening degree, the roller is close to the brush head; and at the maximum supporting opening degree, the roller is away from the brush head.

15. The electric cleaning brush according to claim 14, wherein a second elastic member is further arranged between the supporting member and the brush main body; and > when the supporting member moves until the supporting opening degree increases, the second elastic member undergoes elastic deformation or undergoes aggravated elastic deformation under the joint action of the supporting member and the brush main body.

16. The electric cleaning brush according to claim 15, wherein the spinning driving assembly drives the brush head and causes the brush head to have a spin-cleaning state of backward brushing; and > when the brush head performs backward brushing, the brush head spins clockwise on the brush main body in the same spinning direction as a rotation direction of the supporting body on the brush main body from the minimum supporting opening degree to the maximum supporting opening degree.

17. The electric cleaning brush according to claim 10, wherein an antisplash part is arranged on the supporting member.

\*　\*　\*　\*　\*